(12) United States Patent
Usuba et al.

(10) Patent No.: US 9,363,486 B2
(45) Date of Patent: Jun. 7, 2016

(54) IMAGE PROCESSING DEVICE, IMAGE PROCESSING METHOD, AND IMAGE PROCESSING SYSTEM

(71) Applicant: FUJI XEROX CO., LTD., Minato-ku, Tokyo (JP)

(72) Inventors: Ryoko Usuba, Yokohama (JP); Noriji Kato, Yokohama (JP); Yukio Kumazawa, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 386 days.

(21) Appl. No.: 14/097,500

(22) Filed: Dec. 5, 2013

(65) Prior Publication Data

US 2014/0092228 A1 Apr. 3, 2014

Related U.S. Application Data

(63) Continuation of application No. PCT/JP2011/075626, filed on Nov. 7, 2011.

(30) Foreign Application Priority Data

Jun. 9, 2011 (JP) ................................ 2011-129350

(51) Int. Cl.
*H04N 7/18* (2006.01)
*G06T 7/00* (2006.01)
*G06K 9/00* (2006.01)

(52) U.S. Cl.
CPC ............... *H04N 7/18* (2013.01); *G06K 9/0014* (2013.01); *G06T 7/0081* (2013.01); *G06T 2207/10056* (2013.01); *G06T 2207/20148* (2013.01); *G06T 2207/30024* (2013.01)

(58) Field of Classification Search
CPC .................. G06K 9/0014; G06T 2207/10056; G06T 2207/30024; G06T 7/0081
See application file for complete search history.

(56) References Cited

U.S. PATENT DOCUMENTS

2009/0190812 A1* 7/2009 Sano .................... A61B 5/0059
382/128
2012/0106822 A1 5/2012 Mimura et al.
(Continued)

FOREIGN PATENT DOCUMENTS

EP  2 169 379 A2  3/2010
JP  06-096192 A   4/1994
(Continued)

OTHER PUBLICATIONS

S. Di Cataldo et al. "Automated segmentation of tissue images for computerized IHC analysis", Computer Methods and Programs in Biomedicine, 2010, pp. 1-15, vol. 100, No. 1.
(Continued)

*Primary Examiner* — Andy Rao
*Assistant Examiner* — Tyler Edwards
(74) *Attorney, Agent, or Firm* — Sughrue Mion, PLLC

(57) ABSTRACT

An image processing device sets a determination target area based on a pixel to a taken image for each of a plurality of pixels included in a pixel group obtained as a candidate of a nucleus of a target cell, and determines whether or not the target cell is included in the determination target area, which is set by the setting section for each of the plurality of pixels included in the pixel group, based on whether or not an image feature amount obtained from the determination target area satisfies a condition of the image feature amount of the target cell.

9 Claims, 11 Drawing Sheets

(56) References Cited

U.S. PATENT DOCUMENTS

| | | |
|---|---|---|
| 2012/0122143 A1 | 5/2012 | Mimura et al. |
| 2012/0134571 A1 | 5/2012 | Ito et al. |
| 2012/0142095 A1 | 6/2012 | Yano et al. |

FOREIGN PATENT DOCUMENTS

| | | |
|---|---|---|
| JP | 10-185911 A | 7/1998 |
| JP | 2004-248619 A | 9/2004 |
| JP | 2004-340728 A | 12/2004 |
| JP | 2009-175040 A | 8/2009 |
| JP | 4346923 B2 | 10/2009 |
| WO | 98/52018 A1 | 11/1998 |
| WO | 00/49391 A1 | 8/2000 |
| WO | 2010/143420 A1 | 12/2010 |
| WO | 2010/146802 A1 | 12/2010 |
| WO | 2011/013319 A1 | 2/2011 |
| WO | 2011/016189 A1 | 2/2011 |

OTHER PUBLICATIONS

Marina E. Plissiti et al., "Combining shape, texture and intensity features for cell nuclei extraction in Pap smear images", Pattern Recognition Letters, Elsevier B.V., 2011, pp. 838-853.

Etsuko Ichida et al., "Auto-extraction of Nucleated Red Blood Cells from Massive Microscopy Images", The Institute of Electronics, Information and Communication Engineers, 2008, pp. 291-296, vol. 107. No. 461.

Yosuke Shimizu et al., "Detection and Retrieval of Nucleated Red Blood Cells Using Linear Subspaces", The Journey of the IIEEJ, Jan. 25, 2011, vol. 40, No. 1, pp. 67-73.

Yosuke Shimizu et al., "Nucleated Red Blood Cells Searching in Microscope Images", ITE Technical Report, Aug. 27, 2009, vol. 33, No. 34, pp. 1-2.

Office Action for Japanese Patent Application No. 2011-129350 dated Mar. 12, 2013.

Partial English language translation of the Office Action of Japanese Patent Application No. 2011-129350 dated Mar. 12, 2013.

Extended European Search Report dated Dec. 15, 2014, issued by the European Patent Office in counterpart European application No. 11867361.5.

Written Opinion of the International Searching Authority issued Dec. 27, 2013 in PCT/JP2011/075626.

Partial translation of the communication dated Jun. 9, 2015, issued by the Japan Patent Office in corresponding Japanese Application No. 2013-162410.

* cited by examiner

TARGET CELL

NUCLEUS CANDIDATE AREA

TARGET CELL CANDIDATE AREA

DETERMINATION TARGET AREA

CANDIDATE RECTANGULAR AREA

FIG.7
(A) 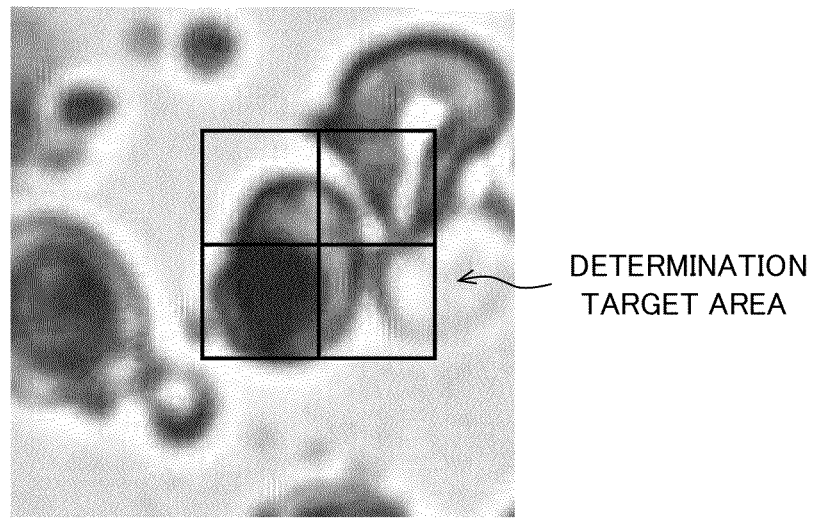
DETERMINATION TARGET AREA
(B) 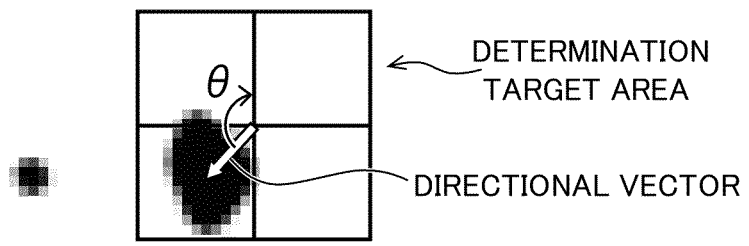
DETERMINATION TARGET AREA
DIRECTIONAL VECTOR
θ
(C) 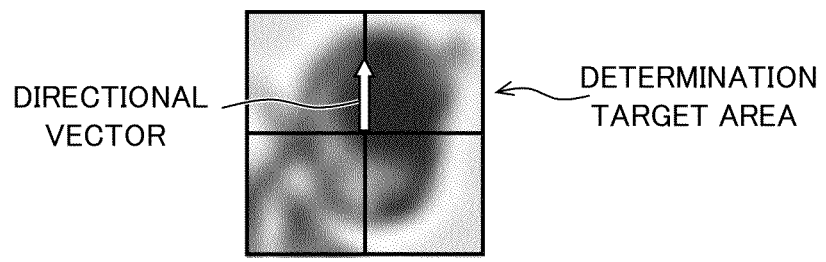
DIRECTIONAL VECTOR
DETERMINATION TARGET AREA

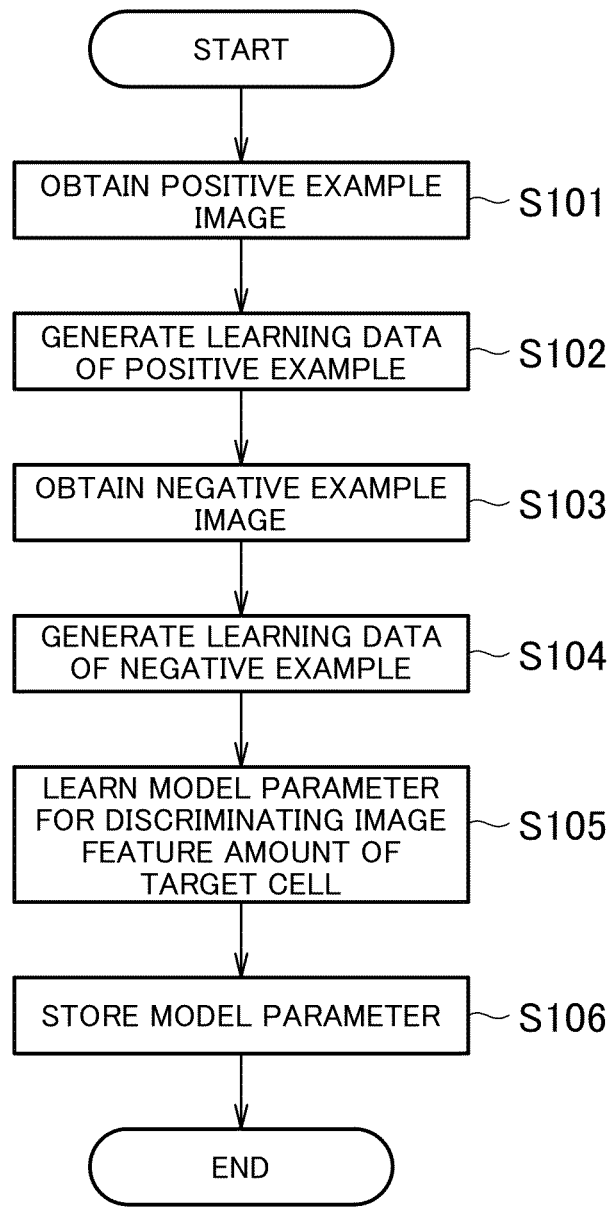

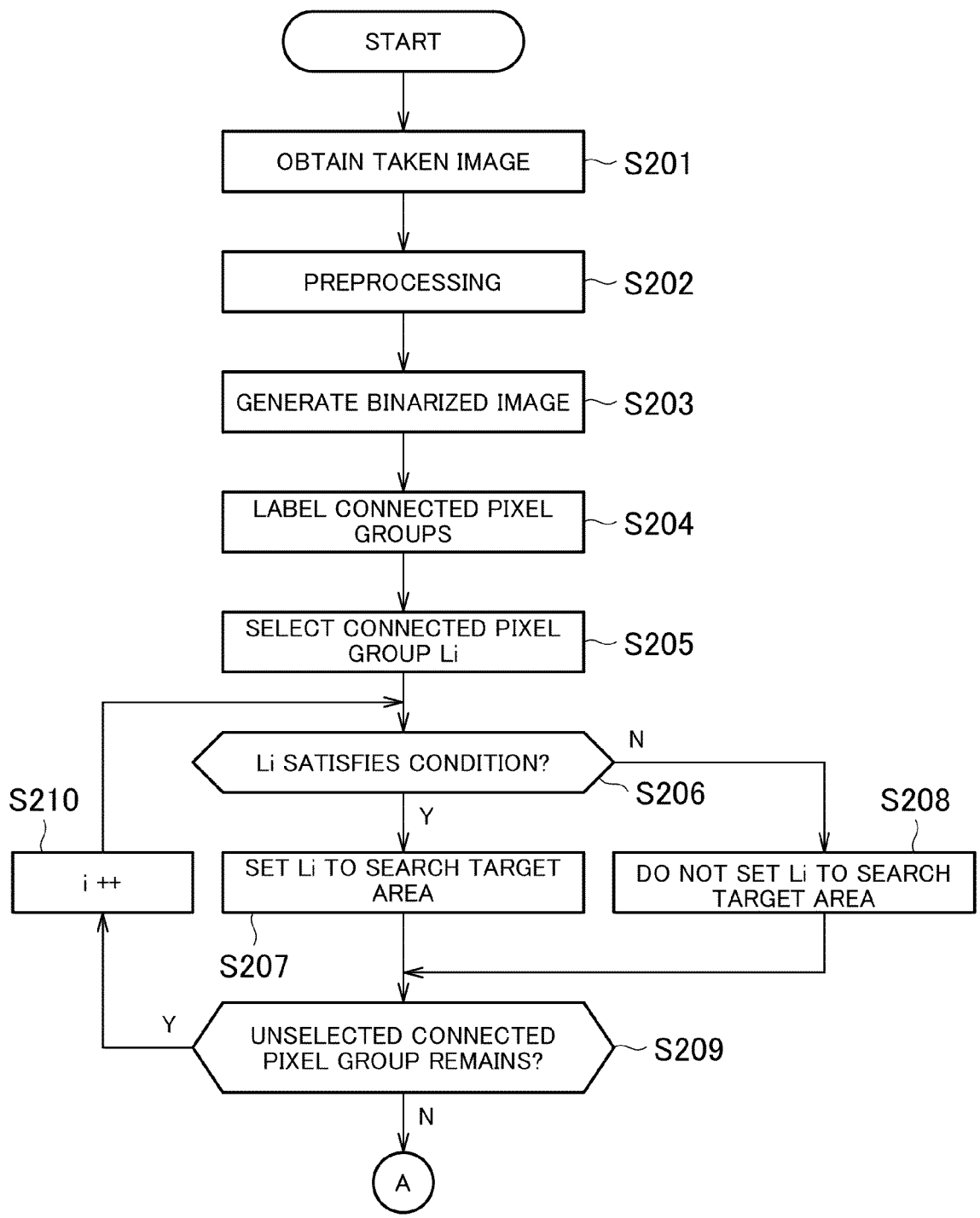

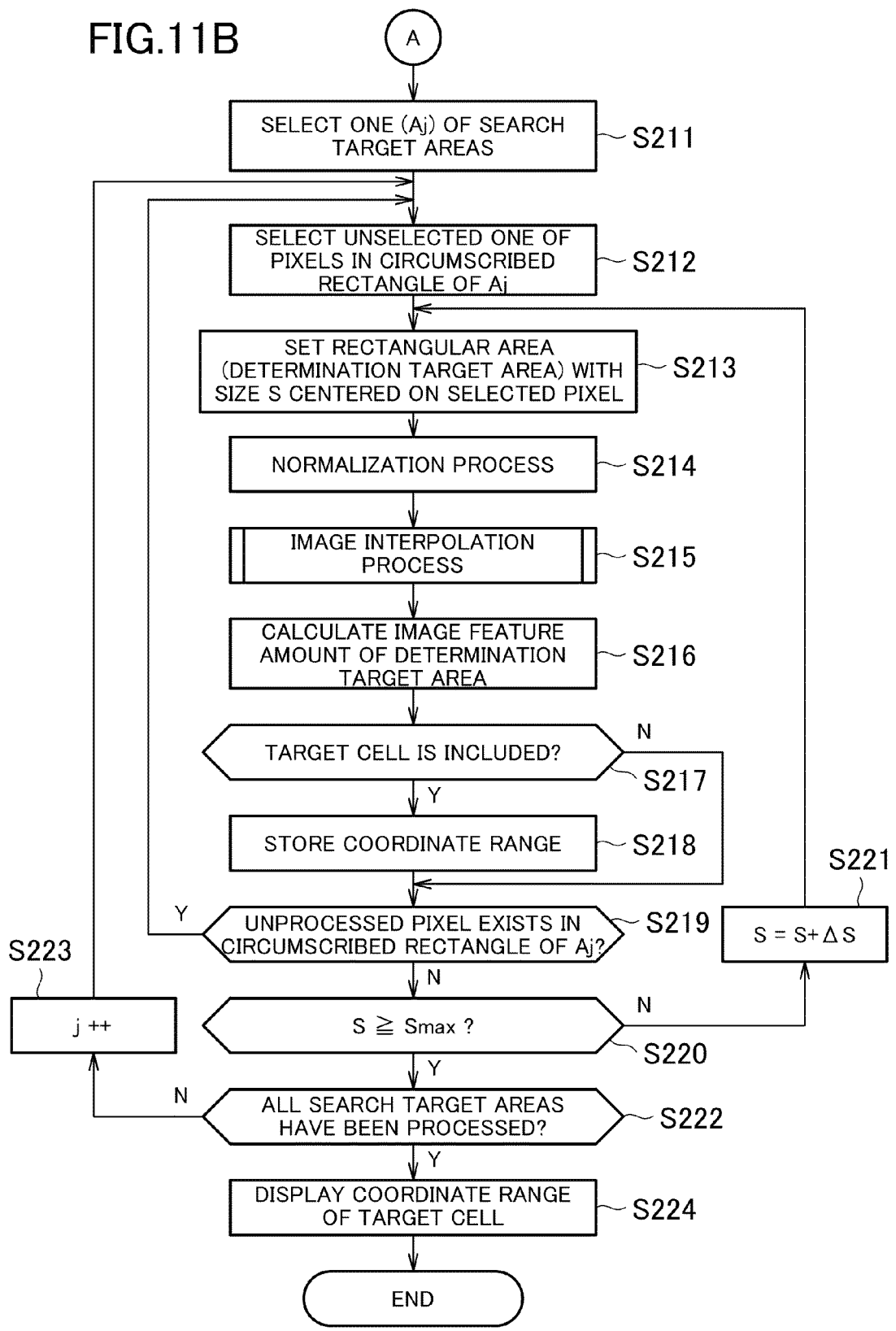

IMAGE PROCESSING DEVICE, IMAGE PROCESSING METHOD, AND IMAGE PROCESSING SYSTEM

CROSS-REFERENCE TO RELATED APPLICATIONS

This application is based on and claims priority under 35 USC 119 from Japanese Patent Application No. 2011-129350 filed on Jun. 9, 2011.

TECHNICAL FIELD

The present invention relates to an image processing device, an image processing method, an image processing system, and a non-transitory computer readable medium.

SUMMARY

According to an aspect of the invention, there is provided an image processing device includes a setting section that sets a determination target area based on a pixel to a taken image for each of a plurality of pixels included in a pixel group obtained as a candidate of a nucleus of a target cell, and a determination section that determines whether or not the target cell is included in the determination target area, which is set by the setting section for each of the plurality of pixels included in the pixel group, based on whether or not an image feature amount obtained from the determination target area satisfies a condition of the image feature amount of the target cell.

BRIEF DESCRIPTION OF DRAWINGS

Exemplary embodiment(s) of the present invention will be described in detail based on the following figures, wherein

FIG. 7 is a diagram for explaining a flow of a process by a normalization section.

FIG. 10 is a flowchart of a learning process of an image feature amount performed based on a positive example and a negative example of the target cell.

FIGS. 11A and 11B are a flowchart of a process of searching the taken image of the sample (maternal blood) with an optical microscope for the target cell.

DETAILED DESCRIPTION

Hereinafter, a configuration of an implementation (hereinafter referred to as an embodiment) for putting the invention into practice will be explained with reference to the accompanying drawings.

Figure 1:
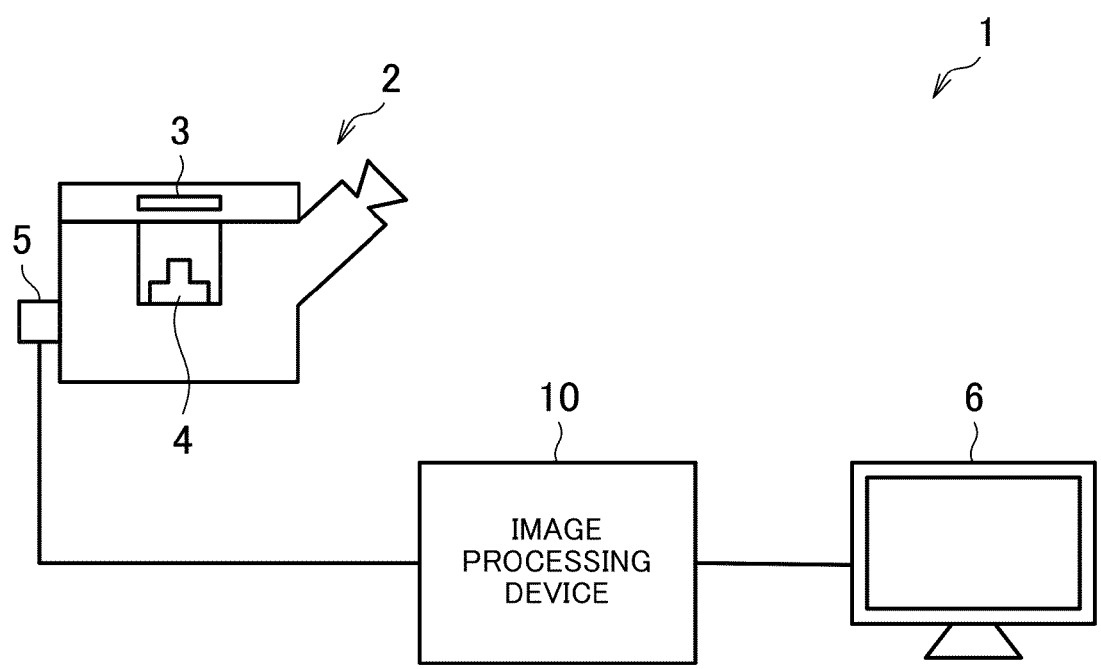
FIG. 1 is a system configuration diagram of an image processing system according to the present embodiment.

FIG. 1 shows a system configuration diagram of an image processing system 1 according to the present embodiment. As shown in FIG. 1, the image processing system 1 includes an optical microscope 2, an image processing device 10, and a display device 6, wherein the image processing device 10 is connected to each of the optical microscope 2 and the display device 6 so as to be able to perform data communication with each other.

The optical microscope 2 takes an image of a sample on a glass slide 3 disposed on a stage via an optical system such as an objective lens 4 using a CCD camera 5. In the present embodiment, what is obtained by applying the maternal blood on the glass slide 3 and then applying May-Giemsa stain is used as the sample. Thus, the fetus-derived nucleated red blood cells (NRBCs) in the maternal blood are stained to have a bluish-purple color. Hereinafter, NRBCs are referred to as target cells.

The image processing device 10 obtains the taken image taken by the optical microscope 2, and at the same time searches the taken image thus obtained for the target cells. The details of the search process for the target cells performed in the image processing device 10 will be described later.

The display device 6 displays the image based on the result of the process by the image processing device 10. For example, on the display device 6, there are displayed the taken image taken by the optical microscope 2, the search result of the target cells by the image processing device 10, and so on.

Figure 2:
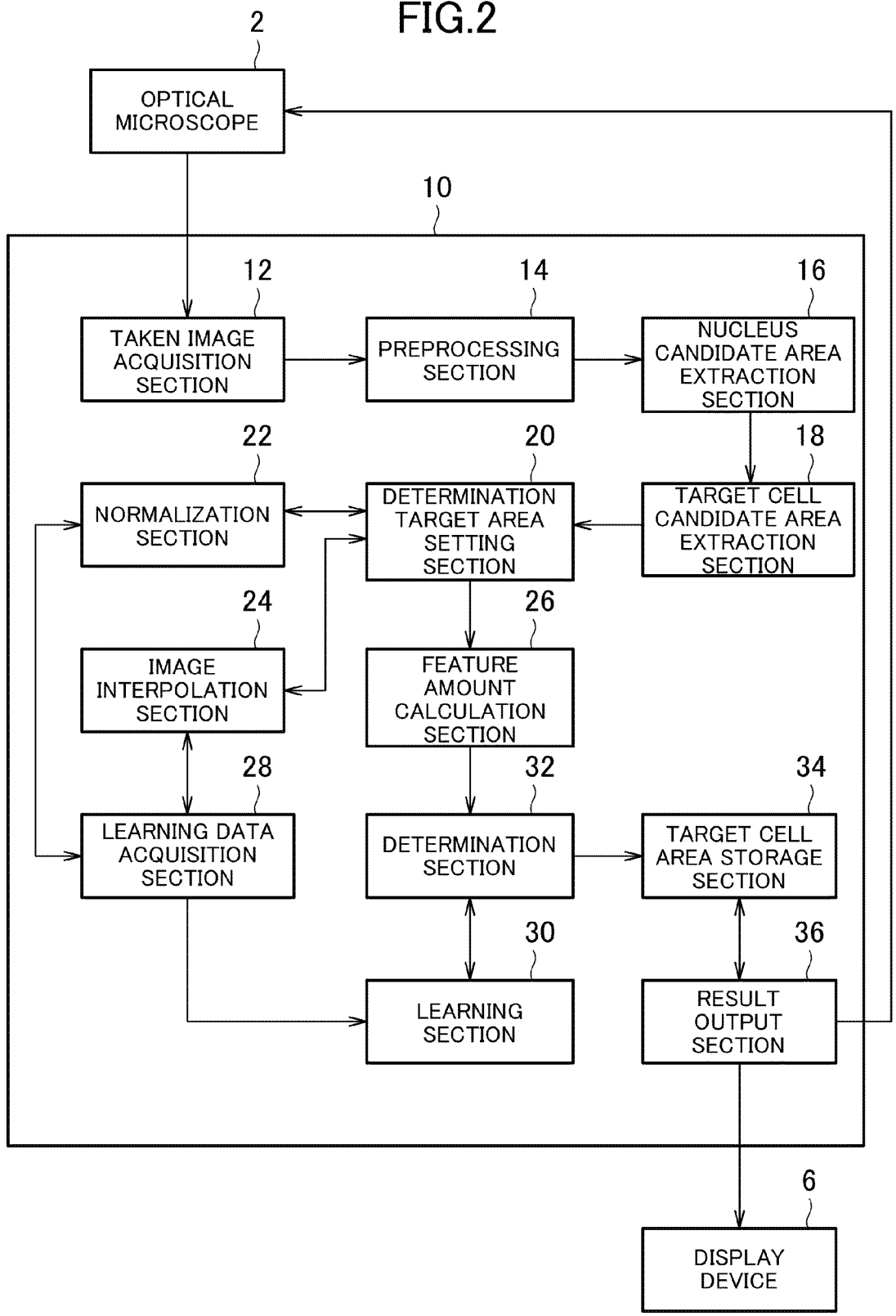
FIG. 2 is a functional block diagram of an image processing device.

FIG. 2 shows a functional block diagram of the image processing device 10. As shown in FIG. 2, the image processing device 10 is provided with a taken image acquisition section 12, a preprocessing section 14, a nucleus candidate area extraction section 16, a target cell candidate area extraction section 18, a determination target area setting section 20, a normalization section 22, an image interpolation section 24, a feature amount calculation section 26, a learning data acquisition section 28, a learning section 30, a determination section 32, a target cell area storage section 34, and a result output section 36.

The functions of the respective sections described above provided to the image processing device 10 may be realized by a computer, which is provided with a control means such as a CPU, a storage means such as a memory, an input/output means for transmitting/receiving data with an external device, and so on, reading and then executing a program stored in a computer-readable information storage medium. It should be noted that the program may be supplied to the image processing device 10 as the computer by the information storage medium such as an optical disk, a magnetic disk, a magnetic tape, a magneto optical disk, or a flash memory, or the program may be supplied to the image processing device 10 via a data communication network such as the Internet.

The taken image acquisition section 12 obtains the taken image, which is obtained by imaging the sample with the CCD camera 5 provided to the optical microscope 2, from the optical microscope 2.

Figure 3:
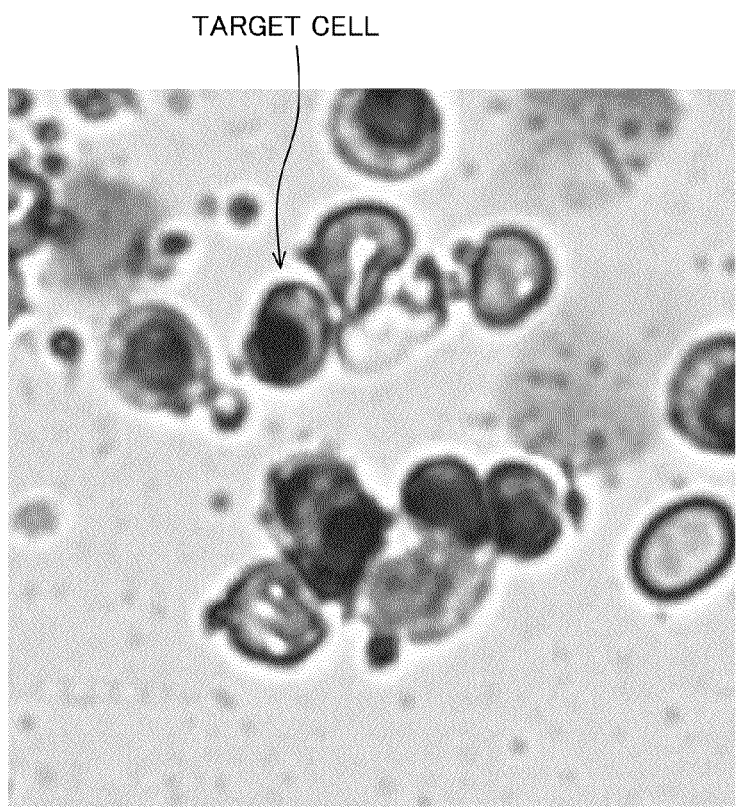
FIG. 3 is a diagram showing an example of a taken image obtained by imaging a sample (maternal blood) with an optical microscope.

FIG. 3 shows an example of the taken image, which is obtained by imaging the sample (the maternal blood) with the optical microscope 2, obtained by the taken image acquisition section 12. In the taken image shown in FIG. 3, a cell having a deeply-colored nucleus is the target cell. It should be noted that the target cells (NRBCs) each have the following four features (see "Automated Extraction of Nucleated Red Blood Cells from Considerable Microscope Images," The Journal of the Institute of Image Electronics Engineers of Japan, vol. 37, No. 5, September 2008). The first feature of NRBCs is the point that a single nucleus exists in each of NRBCs, the shape of the nucleus is an almost true circle, and the density is high.

The second feature is the point that the nucleus of NRBCs is stained by the May-Giemsa stain slightly deeper than nuclei of other cells. The third feature is the point that the area of each of NRBCs and the area of the nucleus, and the ratio between the areas each fall within a specific range. Further, the fourth feature is the point that NRBCs have a slightly larger difference in concentration between the nucleus and the cytoplasm compared to other cells.

The preprocessing section 14 performs image processing such as histogram normalization, color matching by a principal component analysis, mean filter, or median filter on the taken image obtained by the taken image acquisition section 12 to thereby perform the normalization of the color of the taken image and noise removal.

The nucleus candidate area extraction section 16 extracts the pixels having a color or a concentration included in a predetermined range as candidate areas of the nucleus with respect to the taken image from which noise is removed by the preprocessing section 14. For example, the nucleus candidate area extraction section 16 may binarize the pixels in the taken image using a predetermined threshold value of the color (or the concentration), and specifically, the pixels having the color (or the concentration) deeper (higher) than the threshold value (or equal to or higher than the threshold value) may be extracted as black pixels.

Figure 4:
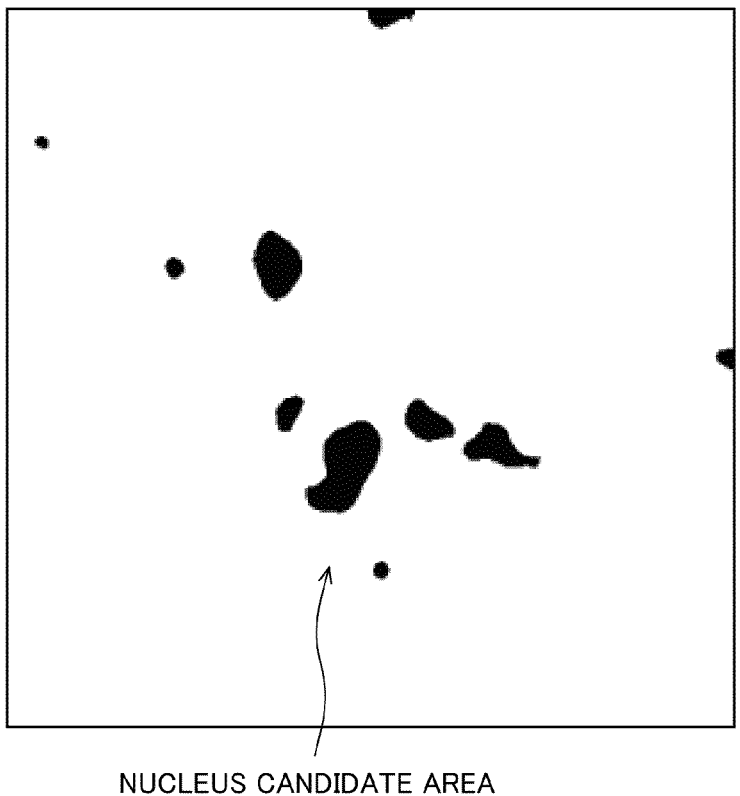
FIG. 4 is a diagram showing an example of pixels of nucleus candidates.

FIG. 4 shows an example of the pixels of the nucleus candidates extracted by the nucleus candidate area extraction section 16 with respect to the taken image shown in FIG. 3. As shown in FIG. 4, due to the process by the nucleus candidate area extraction section 16, the areas (the pixels) to be the candidate of the nucleus are extracted from the taken image.

As pixel groups (target cell candidate areas) to be the candidate of the target cell, the target cell candidate area extraction section 18 extracts connected pixel groups, each of which has a size and a shape satisfying predetermined conditions, from connected pixel groups, each of which is obtained by connecting pixels adjacent to each other among the pixels to be the candidate of the nucleus thus extracted by the nucleus candidate area extraction section 16. For example, the target cell candidate area extraction section 18 labels (the connected pixel groups 1 through n) the connected pixel groups each obtained by connecting the pixels (the black pixels) of the nucleus candidate extracted by the nucleus candidate area extraction section 16, and then sets a circumscribed rectangle to each of the connected pixel groups i (i=1 through n). Further, as the candidates of the target cell, the target cell candidate area extraction section 18 extracts the connected pixel groups each having a vertical length, a horizontal length, and a ratio between the vertical length and the horizontal length of the circumscribed rectangle, and a black pixel density in the circumscribed rectangle each included in a range determined in advance for each of the values.

Figure 5:
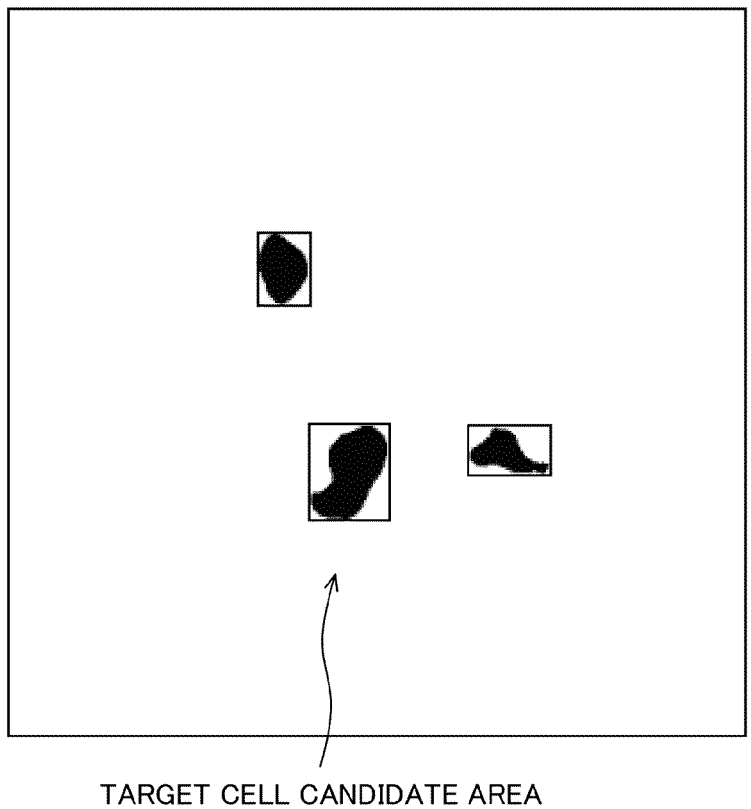
FIG. 5 is a diagram showing an example of pixel groups extracted as candidates of the target cell.

FIG. 5 shows an example of the pixel groups extracted as the candidates of the target cell from the pixels of the nucleus candidates shown in FIG. 4. As shown in FIG. 5, due to the process by the target cell candidate area extraction section 18, the image areas each having a possibility of the nucleus in the target cell are further extracted from the nucleus candidates.

The determination target area setting section 20 sets a rectangular area (a determination target rectangular area) having a predetermined size (e.g., N×M pixels) centered on the pixel of the rectangular area (a candidate rectangular area), which is set to the connected pixel group extracted by the target cell candidate area extraction section 18, to the taken image. For example, the determination target area setting section 20 selects one pixel from the candidate rectangular area, then identifies the corresponding pixel in the taken image based on the positional coordinate of the one pixel thus selected, and then sets the determination target rectangular area having a predetermined size centered on the corresponding pixel thus identified. It should be noted that the determination target area setting section 20 sequentially may select one pixel from the candidate rectangular area, and then set the determination target area for every selected pixel.

Figure 6:
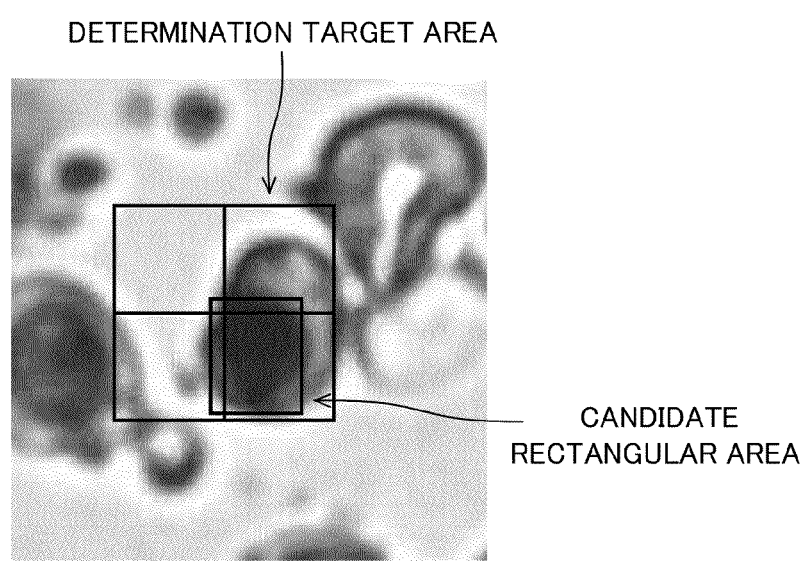
FIG. 6 is a diagram showing an example of a determination target area set in the taken image.

FIG. 6 shows an example of the determination target area set in the taken image by the determination target area setting section 20. As shown in FIG. 6, the determination target area is set centered on one pixel in the candidate rectangular area.

The normalization section 22 performs a process of rotating the image in the determination target area set by the determination target area setting section 20 so that the direction of the image coincides with a predetermined direction. For example, the normalization section 22 obtains a centroid position of the binarized image in the determination target area, and then calculates a rotational angle necessary for a directional vector, which connects the center position of the determination target area and the centroid position obtained as described above, to point to a predetermined direction (e.g., an upward direction). Then, the normalization section 22 rotates the image (a partial image of the taken image) in the determination target area at the rotational angle calculated as described above. It should be noted that the process by the normalization section 22 is not necessarily required to be performed.

FIG. 7 shows diagrams for explaining the flow of the process by the normalization section 22. FIG. 7(A) is the determination target area set in the taken image, and FIG. 7(B) is the binarized image in the determination target area. Further, FIG. 7(C) is the image obtained by rotating the taken image shown in FIG. 7(A) at the rotational angle θ necessary for the directional vector of FIG. 7(B) to point to the upward direction, and then cutting the taken image with the determination target area.

In the case in which an end of the taken image is included in the determination target area set by the determination target area setting section 20, the image interpolation section 24 interpolates the image in the determination target area. For example, the image interpolation section 24 expands the determination target area so as to have a predetermined size (2M×2M), and then sets the longest part of line segments, which are parallel to the end of the taken image in the binarized image included in the determination target area thus expanded, to the center line. Then, the image interpolation section 24 obtains the distance L from the center line thus set to the end of the taken image, and then moves a partial area, which is composed of (M−L) pixels perpendicular to the center line, and 2M pixels parallel to the center line, from the end opposed to the end of the taken image with respect to the center line to the position line symmetrical about the center line in the area thus expanded to thereby interpolate the image in the determination target area.

Figure 8:
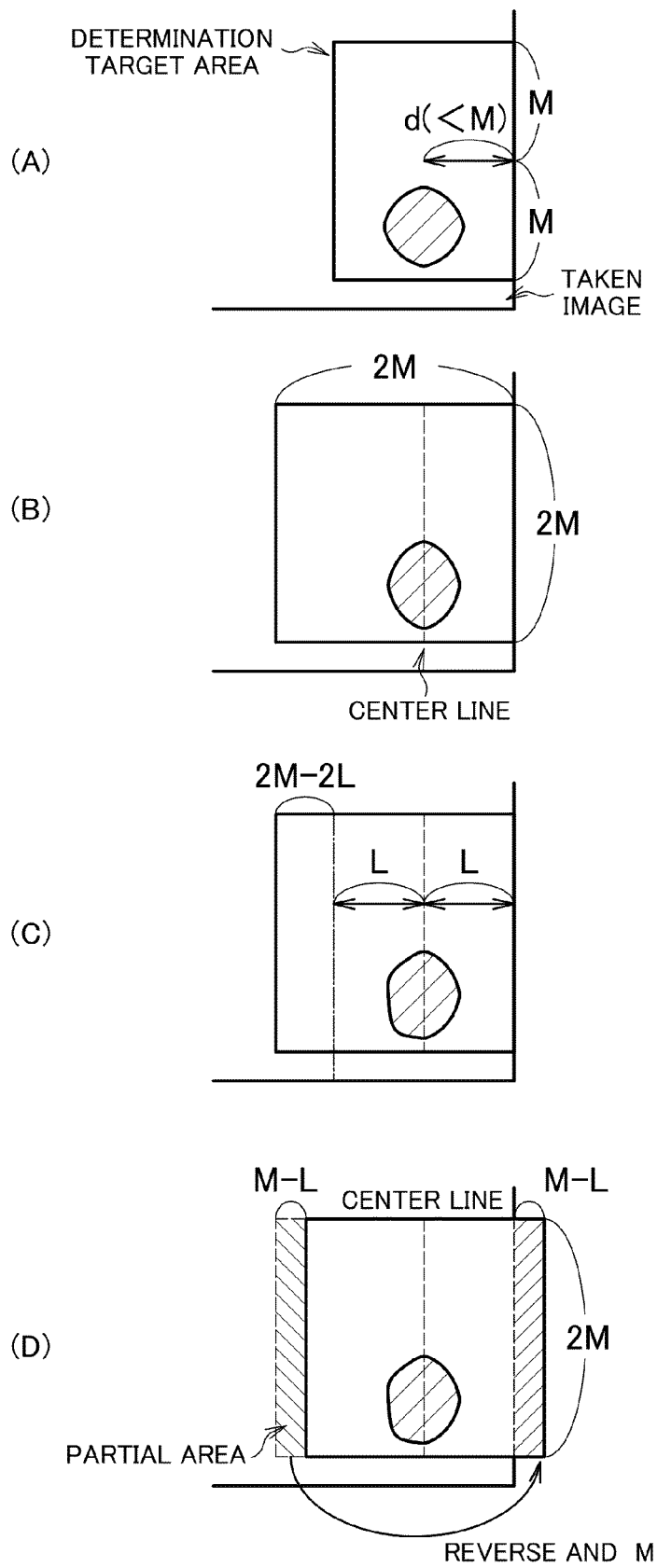
FIG. 8 is a diagram for explaining a flow of a process by an image interpolation section.

FIG. 8 shows diagrams for explaining the flow of the process by the image interpolation section 24. FIG. 8(A) is an example of the determination target area set by the determination target area setting section 20, and as shown in FIG. 8(A), the determination target area includes the end of the taken image. On this occasion, as shown in FIG. 8(B), the image interpolation section 24 expands the determination target area so as to have a size of 2M×2M, and then sets the position of a line segment, which is parallel to the end of the taken image and the longest of the binarized image in the determination target area, as the center line. Then, the image interpolation section 24 obtains (see FIG. 8(C)) the length L between the center line and the end of the taken image, and then moves the partial area, which is composed of (M−L) pixels perpendicular to the center line and 2M pixels parallel to the center line, from the end opposed to the end of the taken image with respect to the center line to the position line symmetrical about the center line in the determination target area thus expanded, and combines the partial area to the position, which is shown in FIG. 8(D). It should be noted that the partial area to be combined may be reversed about the center line.

The feature amount calculation section 26 calculates the image feature amount with respect to the image (the image is preferably normalized by the normalization section, but an image on which no normalization process is performed can also be adopted) in the determination target area set by the determination target area setting section 20. For example, the HOG feature amount may be used for the image feature amount.

Figure 9:
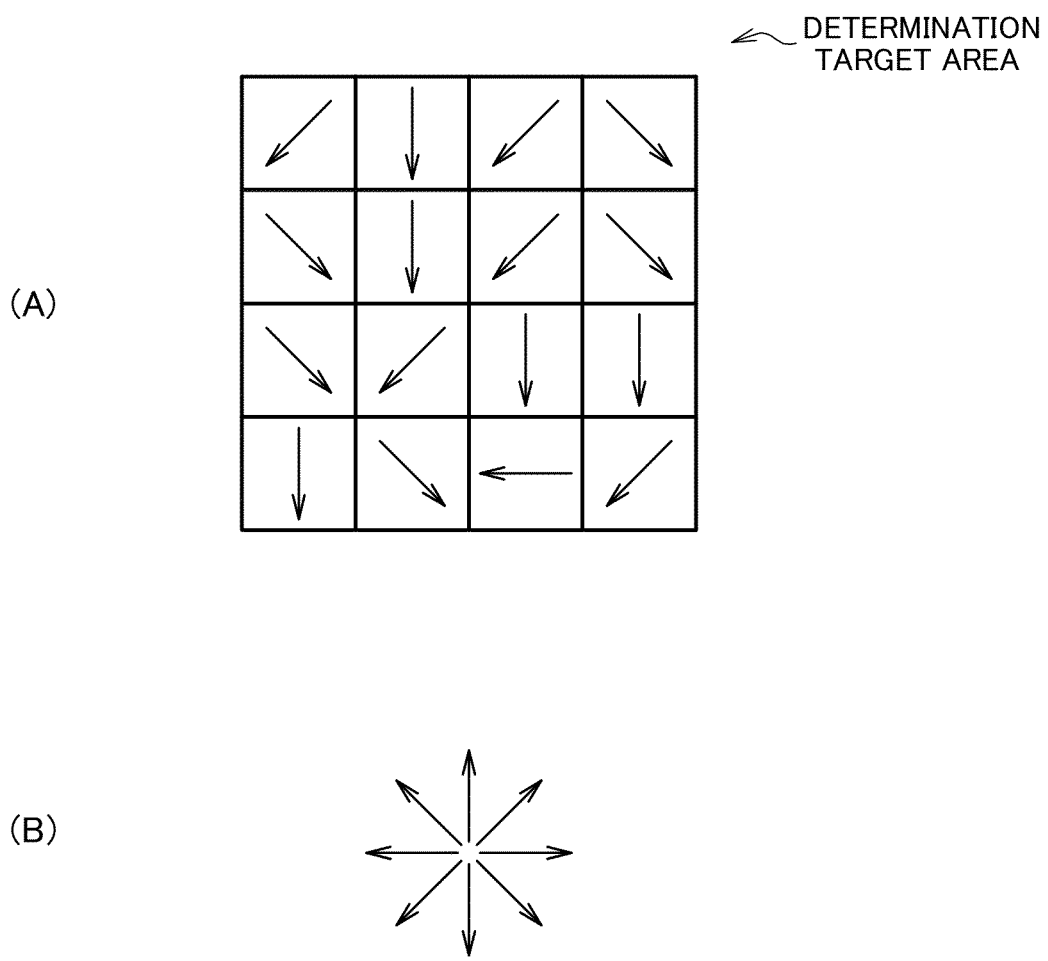
FIG. 9 is a diagram for explaining a HOG feature amount.

FIG. 9 shows diagrams for explaining the HOG feature amount calculated by the feature amount calculation section 26. As shown in FIG. 9(A), the HOG feature amount is calculated by dividing the determination target area into a predetermined number (e.g., 4×4) of partial areas, calculating a direction of a luminance gradient in each of the pixels in each of the partial areas, calculating a histogram of the luminance gradient direction thus calculated with respect to each of the partial areas, and connecting the histograms of the respective partial areas to each other. As shown in FIG. 9(B), the luminance gradient directions may be, for example, the 8 directions (upper, upper right, lower right, right, lower, lower left, left, and upper left).

The learning data acquisition section 28 obtains sample images of a positive example and a negative example of the target cell, and then obtains the image feature amount with respect to each of the sample images of the positive example and the negative example thus obtained. For example, the HOG feature amount may be calculated with the feature amount calculation section 26 with respect to the sample images, and the learning data acquisition section 28 may obtain the result.

The learning section 30 learns the conditions (criteria) of the image feature amount for distinguishing the target cell from others based on the image feature amount of each of the positive example and the negative example obtained by the learning data acquisition section 28. It should be noted that the learning may be performed using a learning algorithm such as Support Vector Machine or AdaBoost. For example, in the case of using the Support Vector Machine for the learning, the condition of the image feature amount to be learned is represented by a hyperplane for separating the image feature amount coinciding with the target cell and the image feature amount failing to coincide with the target cell from each other.

The determination section 32 determines whether or not the image in a determination target area described above represents the target cell based on whether or not the image feature amount, which is calculated by the feature amount calculation section 26 with respect to the image in the determination target area set by the determination target area setting section 20, satisfies the condition of the image feature amount for distinguishing the target cell learned by the learning section 30 from others.

The target cell area storage section 34 stores a coordinate range in the taken image corresponding to the determination target area determined to include the target cell by the determination section 32. It should be noted that it is also possible to arrange that the target cell area storage section 34 stores the part, where a plurality of determination target areas determined to include the target cell overlap each other, as an existing area of the target cell.

The result output section 36 outputs the result based on the coordinate range of the taken image stored in the target cell area storage section 34. For example, the result output section 36 may perform the process of making the display device 6 display the image for displaying the coordinate range of the taken image stored in the target cell area storage section 34, or moving the imaging position of the optical microscope 2 to the coordinate range.

Then, an example of the flow of the process performed in the image processing device 10 will be explained with reference to the flowcharts shown in FIGS. 10, 11A, 11B, and 12.

FIG. 10 shows a flowchart of a learning process of the image feature amount performed based on the positive example and the negative example of the target cell.

The image processing device 10 obtains (S101) the positive example image of the target cell, and then calculates the image feature amount (the HOG feature amount) from the positive example image thus obtained to thereby generate (S102) the learning data of the positive example.

Then, the image processing device 10 obtains (S103) the negative example image of the target cell, and then calculates the image feature amount (the HOG feature amount) from the negative example image thus obtained to thereby generate (S104) the learning data of the negative example.

The image processing device 10 learns (S105) a state (a model parameter) of a discriminator for discriminating the image feature amount of the target cell based on the learning data of the positive example and the learning data of the negative example, then stores (S106) the model parameter thus learned, and then terminates the learning process.

Then, a process of searching the taken image of the sample (the maternal blood) with the optical microscope 2 for the target cell will be explained with reference to the flowchart shown in FIGS. 11A, 11B.

As shown in FIG. 11A, the image processing device 10 obtains (S201) the taken image obtained by imaging the maternal blood with the optical microscope 2, and then performs (S202) the preprocessing such as the median filter on the taken image thus obtained. Further, the image processing device 10 generates (S203) the binarized image in which the pixels each having a color (e.g., RGB values) within a predetermined range are set to 1 (black pixels) and the other pixels are set to 0 (white pixels) with respect to the taken image on which the preprocessing has been performed. Here, the black pixels in the binarized image represent the candidate area of the nucleus.

The image processing device 10 connects the pixels adjacent to each other among the black pixels in the binarized image to thereby generate the connected pixel groups, and then performs (S204) the labeling of the connected pixel groups.

The image processing device 10 selects (S205, the connected pixel group selected here is denoted with Li, and the initial value of i is 1) one of the connected pixel groups thus labeled, and then determines (S206) whether or not the size and the shape of the circumscribed rectangle set with respect to Li satisfy the conditions, which should be satisfied by the candidate of the target cell. In the case in which it is determined in the step S206 that the condition is satisfied (S206: Y), Li is set (S207) as the search target area for the target cell. In the case in which it is determined in the step S206 that the condition is not satisfied (S206: N), Li is not set (S208) as the search target area for the target cell. In the case in which any unselected connected pixel group remains (S209: Y), the image processing device 10 increments (S210) i, and then returns to S206. In the case in which no unselected connected pixel group remains (S209: N), the image processing device 10 proceeds to S211.

As shown in FIG. 11B, the image processing device 10 selects (S211, the search target area selected here is denoted with Aj, and the initial value of j is 1) one of the search target areas (A1 through Am) set as described above, and further selects (S212) unselected one of the pixels in the circumscribed rectangle of Aj. Then, the image processing device 10 sets (S213) the rectangular area (the determination target area: size S, an initial value of S is equal to Smin), which has a predetermined size centered on the pixel selected as described above, to the taken image, then normalizes (S214) the direction of the image of the determination target area thus set, and further performs (S215) the image interpolation process in the case in which the distance from the center of the determination target area to the end of the taken image is shorter than the threshold value (i.e., the case in which the determination target area is cut at the end of the taken image). The details of the flow of the image interpolation process will be described later.

After the process described above, the image processing device 10 calculates (S216) the image feature amount of the image included in the determination target area set as described above, determines (S217) whether or not the target cell is included in the determination target area based on the image feature amount thus calculated and the model parameter of the discriminator for discriminating the image feature amount of the target cell learned in advance, and in the case in which it is determined that the target cell is included (S217: Y), stores (S218) the coordinate range of the taken image corresponding to the determination target area. After S218, or in the case in which it is determined in S217 that the target cell is not included (S217: N), in the case in which any unprocessed pixel remains in the pixels within the circumscribed rectangle of Aj (S219: Y), the image processing device 10 returns to S212, or in the case in which no unprocessed pixel remains (S219: N), the image processing device 10 determines (S220) whether or not the size S of the determination target area has reached Smax (>Smin). Here, in the case in which the size S of the determination target area has not yet reached Smax (S220: N), the image processing device 10 increase (S221) S by ΔS, and then returns to S213, or in the case in which the size S of the determination target area has reached Smax (S220: Y), proceeds to S222.

In the case in which all of the search target areas have not yet been processed (S222: N), the image processing device 10 increments (S223) j of Aj, then returns to S212. In the case in which all of the search target areas have been processed (S222: Y), the image processing device 10 displays (S224) the coordinate range of the taken image, which has been determined to include the target cell, and then terminates the process.

Figure 12:
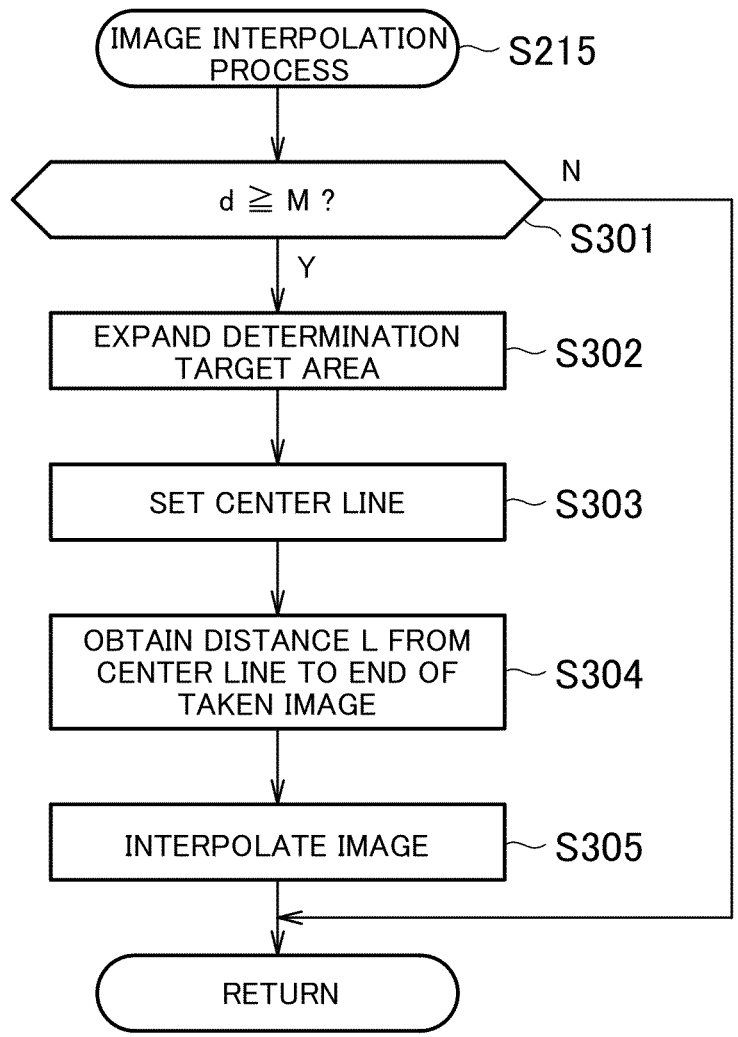
FIG. 12 is a flowchart of an image interpolation process.

Then, the flow of the image interpolation process shown in S215 will be explained with reference to the flowchart shown in FIG. 12.

In the case in which the distance (d) from the center of the determination target area to the end of the taken image is shorter than the threshold value (M) (S301: N), the image processing device 10 expands (S302) the area based on the end of the taken image so that the length of each side becomes M+M pixels, and then sets (S303) the longest part of line segments, which are parallel to the end of the taken image in the binarized image included in the area thus expanded, to the center line.

The image processing device 10 obtains (S304) the distance L from the center line thus set to the end of the taken image, and then moves a partial area, which is composed of (M−L) pixels perpendicular to the center line, and 2M pixels parallel to the center line, from the end opposed to the end of the taken image with respect to the center line to the position line symmetrical about the center line in the area thus expanded to thereby interpolate (S305) the image in the determination target area. After S305, or in the case in which the distance (d) from the center of the determination target area to the end of the taken image is equal to or longer than the threshold value (S301: Y), the image processing device 10 returns.

According to the image processing system 1 related to the present embodiment explained hereinabove, since it is arranged that a first refinement is performed on the candidates of the NRBCs (the target cells) included in the maternal blood with the color or the concentration, then the determination target areas are set based on the result of a second refinement further performed on the candidates obtained by the first refinement with the size and the shape of NRBCs, and then whether or not NRBCs are included in the determination target areas is determined by comparing the image feature amount obtained from the determination target area and the criterion obtained by learning based on the positive example and the negative example of NRBCs with each other, it becomes difficult to be affected by the difference between the specimens of the maternal blood and the difference in imaging conditions and so on while easing the burden on the process for detecting NRBCs included in the maternal blood compared to the case of performing the pattern matching on each of the candidates of the cells.

The invention is not limited to the embodiment described above. For example, although in the embodiment described above, there is described the example of the image processing system 1 in which the taken image of the sample is sequentially input from the optical microscope 2, it is also possible to arrange that the image processing device 10 receives a search request for the target cell in the taken image from an information processing device via the communication network, and then returns the search result to the information processing device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing device comprising:
a setting section that sets a determination target area based on a pixel to a taken image for each of a plurality of pixels included in a pixel group obtained as a candidate of a nucleus of a target cell; and
a determination section that determines whether or not the target cell is included in the determination target area, which is set by the setting section for each of the plurality of pixels included in the pixel group, based on whether or not an image feature amount obtained from the determination target area satisfies a condition of the image feature amount of the target cell.

2. The image processing device according to claim 1, further comprising:
a pixel extraction section that extracts pixels to be a candidate of a nucleus from pixels included in the taken image obtained by imaging a sample including a target cell having the nucleus,
wherein the setting section sets the determination target area based on a pixel to the taken image for each of the plurality of pixels included in the pixels extracted by the pixel extraction section.

3. The image processing device according to claim 1, wherein the pixel group is obtained by connecting adjacent ones of the pixels.

4. The image processing device according to claim 1, wherein the setting section sets the determination target area centered on a pixel to the taken image for each of the plurality of pixels included in the pixel group.

5. The image processing device according to claim 1, wherein the determination target area is rectangular.

6. An image processing device comprising:
acquisition section that acquires a taken image obtained by imaging a sample including a target cell having a nucleus;
first extraction section that extracts pixels to be a candidate of the nucleus from pixels included in the taken image based on a first condition determined in advance with respect to at least one of a color and a luminance, which the pixels to be the candidate are required to have;
second extraction section that extracts a pixel group to be a candidate of the target cell from pixel groups, each of which is obtained by connecting adjacent ones of the pixels extracted by the first extraction section, based on a second condition determined in advance with respect to a size and a shape, which the pixel group to be the candidate is required to have;
setting section that sets a rectangular area, which has a predetermined size and is centered on a pixel included in the pixel group extracted by the second extraction section, to the taken image; and
determination section that determines whether or not the target cell is included in the rectangular area based on whether or not an image feature amount obtained form the rectangular area set by the setting section satisfies a condition of the image feature amount.

7. A non-transitory computer readable medium storing a program causing a computer to execute a process for processing an image, the process comprising:

(a) setting a determination target area based on a pixel to a taken image for each of a plurality of pixels included in a pixel group obtained as a candidate of a nucleus of a target cell; and
(b) determining whether or not the target cell is included in the determination target area, which is set in step (a) for each of the plurality of pixels included in the pixel group, based on whether or not an image feature amount obtained from the determination target area satisfies a condition of the image feature amount of the target cell.

8. An image processing method comprising:
(a) setting a determination target area based on a pixel to a taken image for each of a plurality of pixels included in a pixel group obtained as a candidate of a nucleus of a target cell; and
(b) determining whether or not the target cell is included in the determination target area, which is set in step (a) for each of the plurality of pixels included in the pixel group, based on whether or not an image feature amount obtained from the determination target area satisfies a condition of the image feature amount of the target cell.

9. An image processing system comprising:
an image processing device;
an optical microscope to be connected to the image processing device; and
a display device to be connected to the image processing device,
wherein the image processing device includes
a pixel extraction section that extracts pixels to be a candidate of a nucleus from pixels included in a taken image obtained by imaging a sample including a target cell having the nucleus,
a setting section that sets a determination target area based on a pixel to the taken image for each of a plurality of pixels included in the pixels extracted by the pixel extraction section, and
a determination section that determines whether or not the target cell is included in the determination target area, which is set by the setting section for each of the plurality of pixels included in the connected pixel group, based on whether or not an image feature amount obtained from the determination target area satisfies a condition of the image feature amount of the target cell.

* * * * *